(12) United States Patent
Lee

(10) Patent No.: US 9,690,082 B2
(45) Date of Patent: Jun. 27, 2017

(54) WIDE-ANGLE PROJECTION LENS

(71) Applicants: Sintai Optical (Shenzhen) Co., Ltd., Shenzhen, Guandong Province (CN); Asia Optical Co., Inc., Taichung (TW)

(72) Inventor: Tsan-Haw Lee, Taichung (TW)

(73) Assignees: SINTAI OPTICAL (SHENZHEN) CO., LTD., Shenzhen, Guangdong Province (CN); ASIA OPTICAL CO., INC., Taichung (TW)

( * ) Notice: Subject to any disclaimer, the term of this patent is extended or adjusted under 35 U.S.C. 154(b) by 2 days.

(21) Appl. No.: 14/735,181

(22) Filed: Jun. 10, 2015

(65) Prior Publication Data
US 2015/0362708 A1  Dec. 17, 2015

(30) Foreign Application Priority Data
Jun. 17, 2014  (TW) .............................. 103120803 A

(51) Int. Cl.
*G02B 13/16* (2006.01)
*G02B 13/04* (2006.01)
*G02B 13/18* (2006.01)
*G02B 9/64* (2006.01)

(52) U.S. Cl.
CPC .............. *G02B 13/16* (2013.01); *G02B 13/04* (2013.01); *G02B 9/64* (2013.01); *G02B 13/18* (2013.01)

(58) Field of Classification Search
CPC ........ G02B 13/04; G02B 13/06; G02B 13/16; G02B 13/22
USPC ......................................................... 359/651
See application file for complete search history.

(56) References Cited

U.S. PATENT DOCUMENTS

| 7,012,758 B2* | 3/2006 | Masubuchi ............ G02B 13/16 359/649 |
| 7,057,825 B2* | 6/2006 | Kobayashi ............. G03B 21/10 359/651 |
| 7,880,973 B2* | 2/2011 | Amano .................. G02B 13/04 359/651 |
| 2014/0133038 A1* | 5/2014 | Lee ........................ G02B 13/04 359/708 |

(Continued)

FOREIGN PATENT DOCUMENTS

TW  200912369 B  10/2012

OTHER PUBLICATIONS

Ohara Inc.: S-LAL/L-LAL. Ohara Inc. : S-LAL/L-LAL. N.p., n.d. Web. Aug. 11, 2016.*

(Continued)

*Primary Examiner* — Zachary Wilkes
(74) *Attorney, Agent, or Firm* — McClure, Qualey & Rodack, LLP

(57) ABSTRACT

A wide-angle projection lens includes a first lens group with negative refractive power, a second lens group with positive refractive power and a third lens group with positive refractive power, all of which are arranged in order from a projection side to an image source side along an optical axis. The third lens group includes a first lens, a second lens, a third lens, a fourth lens, a fifth lens and a sixth lens, all of which are arranged in order from the projection side to the image source side along the optical axis, wherein the third lens and the fourth lens are cemented together to form a cemented lens and there is no air gap between the third lens and the fourth lens.

18 Claims, 12 Drawing Sheets

(56) References Cited

U.S. PATENT DOCUMENTS

2015/0277089 A1* 10/2015 Shimada ................ G02B 9/12
359/753

OTHER PUBLICATIONS

SCHOTT Glass Manufacturers | SCHOTT Glass | SCHOTT North America. SCHOTT Press Releases as RSS. N.p., n.d. Web. Aug. 11, 2016.*
Ohara Inc. : S-TIM/S-FTM/L-TIM. Ohara Inc. : S-TIM/S-FTM/L-TIM. N.p., n.d. Web. Aug. 11, 2016.*
Geary, Joseph M. Introduction to Lens Design: With Practical ZEMAX Examples. Richmond, VA: Willmann-Bell, 2002. p. 23. Print.*
"Ohara Inc. : S-TIH3" Ohara Inc.: S-TIH/S-NPH/L-BBH/L-TIH. N.p., n.d. Web. Dec. 20, 2016.*
"Ohara Inc. : S-TIH6" Ohara Inc.: S-TIH/S-NPH/L-BBH/L-TIH. N.p., n.d. Web. Dec. 20, 2016.*

* cited by examiner

WIDE-ANGLE PROJECTION LENS

BACKGROUND OF THE INVENTION

1. Field of the Invention

The present invention relates to a wide-angle projection lens.

2. Description of the Related Art

Projectors which adopt LED as a light source have the advantage of small size. However, the light flux of an LED light source is apparently smaller than the traditional high pressure mercury-vapor lamp. So projectors which use an LED light source need to adopt a lens with larger aperture, that is a lens with smaller F-number. Generally, projectors which use high pressure mercury-vapor lamp have a projection lens with smaller aperture, where the F-number is generally larger than 2.4. According, this kind of projection lens is unsuitable for projectors which adopt LED as a light source. On the other hand, for projecting a larger scene within a short projecting length, a short-focus lens, which is a wide-angle lens, is needed. For the two aforementioned reasons, there is a need for a new projection lens with small F-number and large angel of view at the same time to fulfill the market.

SUMMARY OF THE INVENTION

The invention provides a wide-angle projection lens to solve the above problems. The wide-angle projection lens is provided with characteristics of a smaller F-number, a larger angle of view and miniaturization, and still has good optical performance and resolution.

The wide-angle projection lens in accordance with an exemplary embodiment of the invention includes, in order from a projection side to an image source side along an optical axis, a first lens group with negative refractive power, a second lens group with positive refractive power and a third lens group with positive refractive power. The third lens group includes a first lens, a second lens, a third lens, a fourth lens, a fifth lens and a sixth lens, all of which are arranged in order from the projection side to the image source side along the optical axis, wherein the third lens and the fourth lens are cemented together to form a cemented lens and there is no air gap between the third lens and the fourth lens.

In another exemplary embodiment, the first lens group satisfies: $0.8<|f_{G1}/f|<1.0$, where $f_{G1}$ is an effective focal length of the first lens group and f is an effective focal length of the wide-angle projection lens.

In yet another exemplary embodiment, the second lens group satisfies: $1.8<|f_{G2}/f|<2.3$, where $f_{G2}$ is an effective focal length of the second lens group and f is an effective focal length of the wide-angle projection lens.

In another exemplary embodiment, the third lens group has at least one lens which is an aspheric lens and satisfies: $2.0<|f_{G3}/f|<2.5$, $2.5<|f_A/f|<3.3$, where $f_{G3}$ is an effective focal length of the third lens group, f is an effective focal length of the wide-angle projection lens, and $f_A$ is an effective focal length of the aspheric lens.

In yet another exemplary embodiment, the wide-angle projection lens satisfies: $4.0<|tt/bf|<5.0$, where tt is a total track length of the wide-angle projection lens and bf is a back focal length of the wide-angle projection lens.

In another exemplary embodiment, the first lens group includes a seventh lens and an eighth lens, all of which are arranged in order from the projection side to the image source side along the optical axis, and the second lens group includes a ninth lens and a tenth lens, all of which are arranged in order from the projection side to the image source side along the optical axis.

In yet another exemplary embodiment, the seventh lens is an aspheric plastic lens and the eighth lens is a spherical glass lens.

In another exemplary embodiment, the ninth lens and the tenth lens are spherical glass lenses.

In yet another exemplary embodiment, the first lens and the second lens are cemented together to form a cemented lens.

In another exemplary embodiment, the third lens has a negative refractive power.

In yet another exemplary embodiment, the third lens group further includes a stop disposed between the second lens group and the first lens.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE ILLUSTRATED EMBODIMENTS

The following description is made for the purpose of illustrating the general principles of the invention and should not be taken in a limiting sense. The scope of the invention is best determined by reference to the appended claims.

Figure 1:
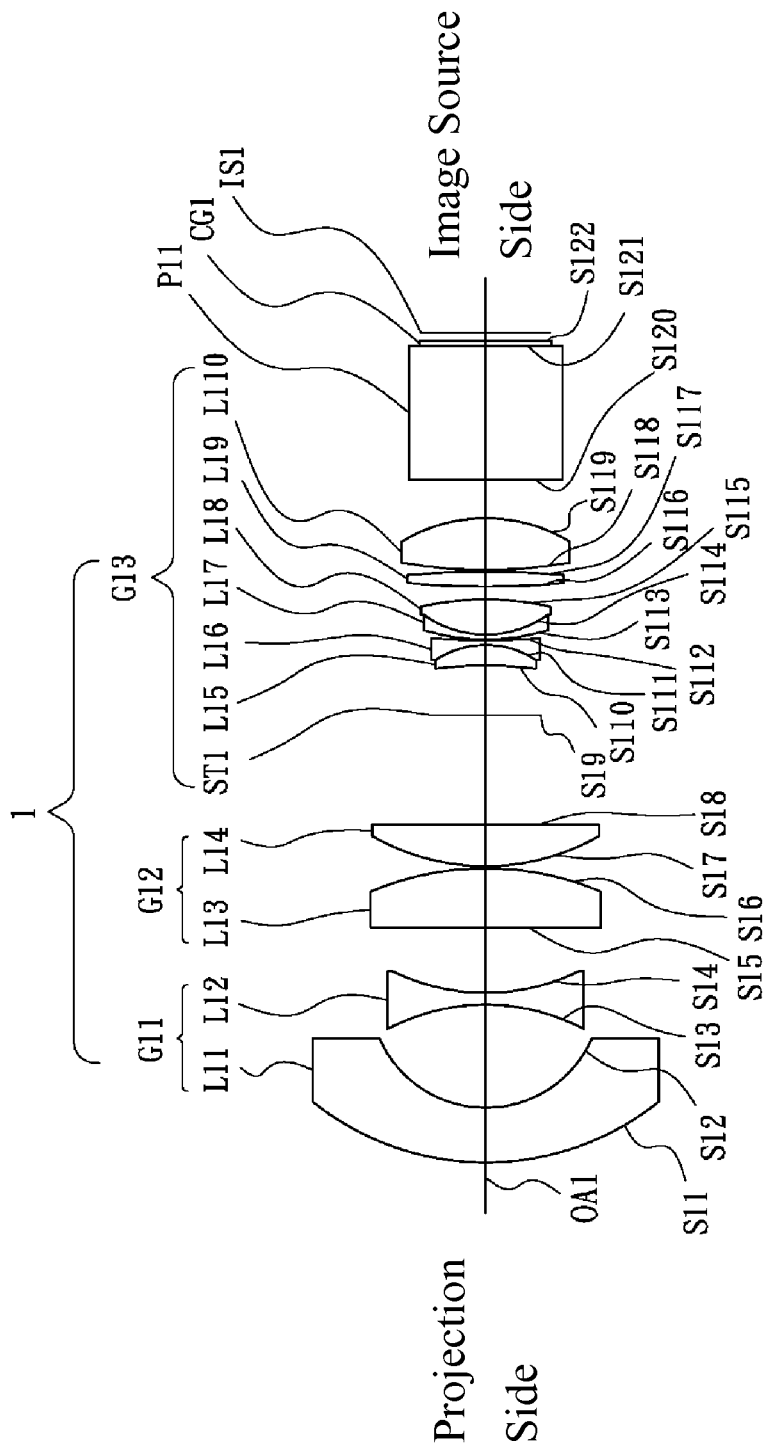
FIG. 1 is a lens layout diagram of a wide-angle projection lens in accordance with a first embodiment of the invention.

Referring to FIG. 1, FIG. 1 is a lens layout diagram of a wide-angle projection lens in accordance with a first embodiment of the invention. The wide-angle projection lens 1 includes a first lens group G11, a second lens group G12 and a third lens group G13, all of which are arranged in order from a projection side to an image source side along an optical axis OA1. In operation, light rays from an image source IS1 are projected on the projection side. The first lens group G11 is with negative refractive power and includes a first lens L11 and a second lens L12, all of which are arranged in order from the projection side to the image source side along the optical axis OA1. The first lens L11 is a meniscus lens made of plastic material and includes a convex surface S11 facing the projection side and a concave surface S12 facing the image source side, wherein both of the convex surface S11 and concave surface S12 are aspheric surfaces. The second lens L12 is a biconcave lens made of glass material, wherein both of a surface S13 facing the projection side and a surface S14 facing the image source side are spherical surfaces. The second lens group G12 is with positive refractive power and includes a third lens L13 and a fourth lens L14, all of which are arranged in order from the projection side to the image source side along the optical axis OA1. The third lens L13 is a biconvex lens made of glass material, wherein both of a surface S15 facing the projection side and a surface S16 facing the image source side are spherical surfaces. The fourth lens L14 is a meniscus lens made of glass material and includes a convex surface S17 facing the projection side and a concave surface S18 facing the image source side, wherein both of the convex surface S17 and the concave surface S18 are spherical surfaces. The third lens group G13 is with positive refractive power and includes a stop ST1, a fifth lens L15, a sixth lens L16, a seventh lens L17, an eighth lens L18, a ninth lens L19 and a tenth lens L10, all of which are arranged in order from the projection side to the image source side along the optical axis OA1. The fifth lens L15 and the sixth lens L16 are cemented together to form a cemented lens which includes a concave surface S110 facing the projection side and a concave surface S112 facing the image source side, wherein both of the surface S110 facing the projection side and the surface S112 facing the image source side are spherical surfaces. The seventh lens L17 and the eighth lens L18 are cemented together to form a cemented lens which includes a convex surface S113 facing the projection side and a convex surface S115 facing the image source side, wherein both of the surface S113 facing the projection side and the surface S115 facing the image source side are spherical surfaces. The ninth lens L19 is a biconvex lens and includes a convex surface S116 facing the projection side and a convex surface S117 facing the image source side, wherein both of the convex surface S116 and the convex surface S117 are spherical surfaces. The tenth lens L110 is a biconvex lens and includes a convex surface S118 facing the projection side and a convex surface S119 facing the image source side, wherein both of the convex surface S118 and the convex surface S119 are aspheric surfaces.

A prism P11 is disposed between the third lens group G13 and the image source IS1. A cover glass CG1 is disposed between the prism P11 and the image source IS1. All of the surfaces S120, S121 and S122 are plane surfaces.

In order to maintain excellent optical performance of the wide-angle projection lens in accordance with this embodiment of the invention, the wide-angle projection lens 1 must satisfies the following five conditions:

$$0.8 < |fl_{G1}/fl| < 1.0 \quad (1)$$

$$1.8 < |fl_{G2}/fl| < 2.3 \quad (2)$$

$$2.0 < |fl_{G3}/fl| < 2.5 \quad (3)$$

$$2.5 < |fl_A/fl| < 3.3 \quad (4)$$

$$4.0 < |tt1/bf1| < 5.0 \quad (5)$$

wherein fl is an effective focal length of the wide-angle projection lens 1, $fl_{G1}$ is an effective focal length of the first lens group G11, $fl_{G2}$ is an effective focal length of the second lens group G12, $fl_{G3}$ is an effective focal length of the third lens group G13, $fl_A$ is an effective focal length of the aspheric lens included in the third lens group G13, tt1 is a total track length of the wide-angle projection lens 1 and bf1 is a back focal length of the wide-angle projection lens 1.

By the above design of the lenses and stop ST1, the wide-angle projection lens 1 is provided with a shortened total track length, an increased angle of view, a decreased F-number, an increased resolution, an effective corrected aberration and achieves good projection quality.

In order to achieve the above purpose and effectively enhance the optical performance, the wide-angle projection lens 1 in accordance with the first embodiment of the invention is provided with the optical specifications shown in Table 1, which include the effective focal length, F-number, total track length, radius of curvature of each lens surface, thickness between adjacent surface, refractive index of each lens and Abbe number of each lens. Table 1 shows that the effective focal length is equal to 9.188 mm, F-number is equal to 1.50 and total track length is equal to 105.8 mm for the wide-angle projection lens 1 of the first embodiment of the invention.

TABLE 1

Effective Focal Length = 9.188 mm
F-number = 1.50
Total Track Length = 105.8 mm

| Surface Number | Radius of Curvature (mm) | Thickness (mm) | Nd | Vd | Remark |
|---|---|---|---|---|---|
| S11 | 39.44 | 7.0 | 1.525 | 56.4 | The First Lens L11 |
| S12 | 11.394 | 13.16 | | | |
| S13 | −26.66 | 1.5 | 1.80 | 35.0 | The Second Lens L12 |
| S14 | 26.66 | 8.352 | | | |
| S15 | 1000 | 7.62 | 1.834 | 37.2 | The Third Lens L13 |
| S16 | −36.68 | 0.115 | | | |
| S17 | 28.33 | 5.39 | 1.810 | 40.9 | The Fourth Lens L14 |
| S18 | 1000 | 13.97 | | | |
| S19 | ∞ | 6.416 | | | Stop ST1 |
| S110 | −39.068 | 2.54 | 1.50 | 81.5 | The Fifth Lens L15 |
| S111 | −11.452 | 0.6 | 1.72 | 29.2 | The Sixth Lens L16 |
| S112 | 108.75 | 0.1 | | | |
| S113 | 26.402 | 0.6 | 1.834 | 37.2 | The Seventh Lens L17 |
| S114 | 13.452 | 4.6 | 1.50 | 81.5 | The Eighth Lens L18 |
| S115 | −33.24 | 1.472 | | | |
| S116 | 94.26 | 2.03 | 1.810 | 40.9 | The Ninth Lens L19 |
| S117 | −97.26 | 0.14 | | | |
| S118 | 39.35 | 6.67 | 1.525 | 56.4 | The Tenth Lens L110 |
| S119 | −20.952 | 4.87 | | | |
| S120 | ∞ | 17 | 1.52 | 64.2 | Prism P11 |
| S121 | ∞ | 0.65 | 1.49 | 70.2 | Cover Glass CG1 |
| S122 | ∞ | 1.005 | | | |

Table 1

The aspheric surface sag z of each lens in table 1 can be calculated by the followuing formula:

$$z=ch^2/\{(1+[1-(k+1)c^2h^2]^{1/2}\}+Ah^4+Bh^6+Ch^8+Dh^{10}$$

where c is curvature, h is the vertical distance from the lens surface to the optical axis, k is conic constant and A, B, C and D are aspheric coefficients.

In the first embodiment, the conic constant k and the aspheric coefficients A, B, C, D of each surface are shown in Table 2.

TABLE 2

| Surface Number | k | A | B | C | D |
|---|---|---|---|---|---|
| S11 | 1.89319 | −1.02E−05 | 1.57E−08 | −9.54E−12 | −1.38E−14 |
| S12 | −0.69065 | 7.60E−06 | −4.20E−08 | −1.00E−09 | −2.40E−12 |
| S118 | 0 | 3.61E−05 | 1.76E−08 | 1.36E−09 | 7.93E−12 |
| S119 | −0.72376 | −4.99E−06 | −8.17E−08 | −9.32E−10 | 3.46E−12 |

Table 2

For the wide-angle projection lens 1 of the first embodiment, the effective focal length f1 of the wide-angle projection lens 1 is equal to 9.188 mm, the effective focal length f1$_{G1}$ of the first lens group G11 is equal to −8.84 mm, the effective focal length f1$_{G2}$ of the second lens group G12 is equal to 19.356 mm, the effective focal length f1$_{G3}$ of the third lens group G13 is equal to 21.714 mm, the effective focal length f1$_A$ of the aspheric lens included in the third lens group G13 is equal to 26.89 mm, the total track length tt1 is equal to 105.8 mm and the back focal length bf1 is equal to 23.525 mm. According to the above data, the following values can be obtained:

$|f1_{G1}/f1|=0.962$ $|f1_{G2}/f1|=2.107$ $|f1_{G3}/f1|=2.363$ $|f1_A/f1|=2.927$ $|tt1/bf1|=4.5$ which respectively satisfy the above conditions (1)-(5).

Figure 2A:
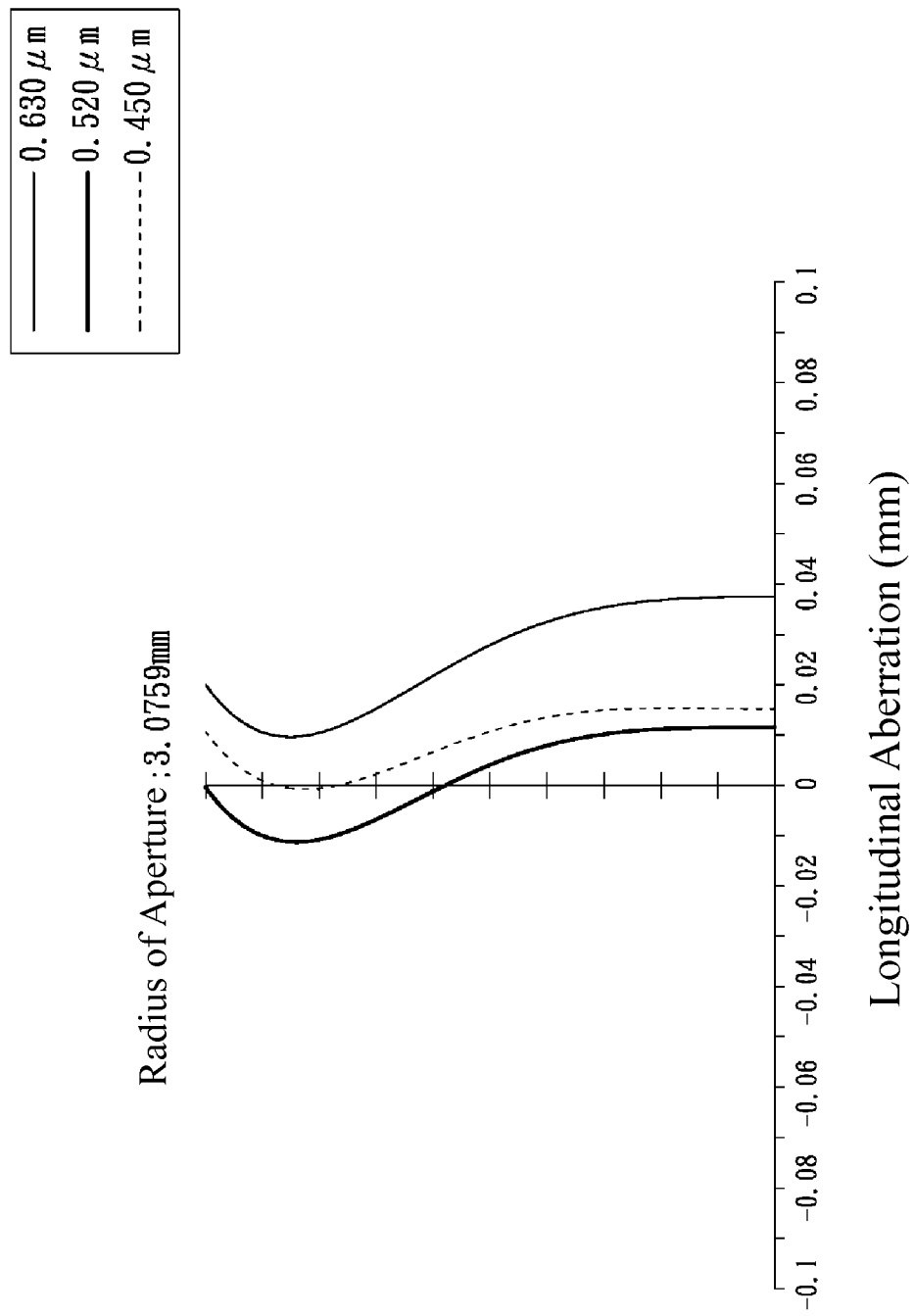
FIG. 2A is a longitudinal aberration diagram of the wide-angle projection lens in accordance with the first embodiment of the invention.
Figure 2B:
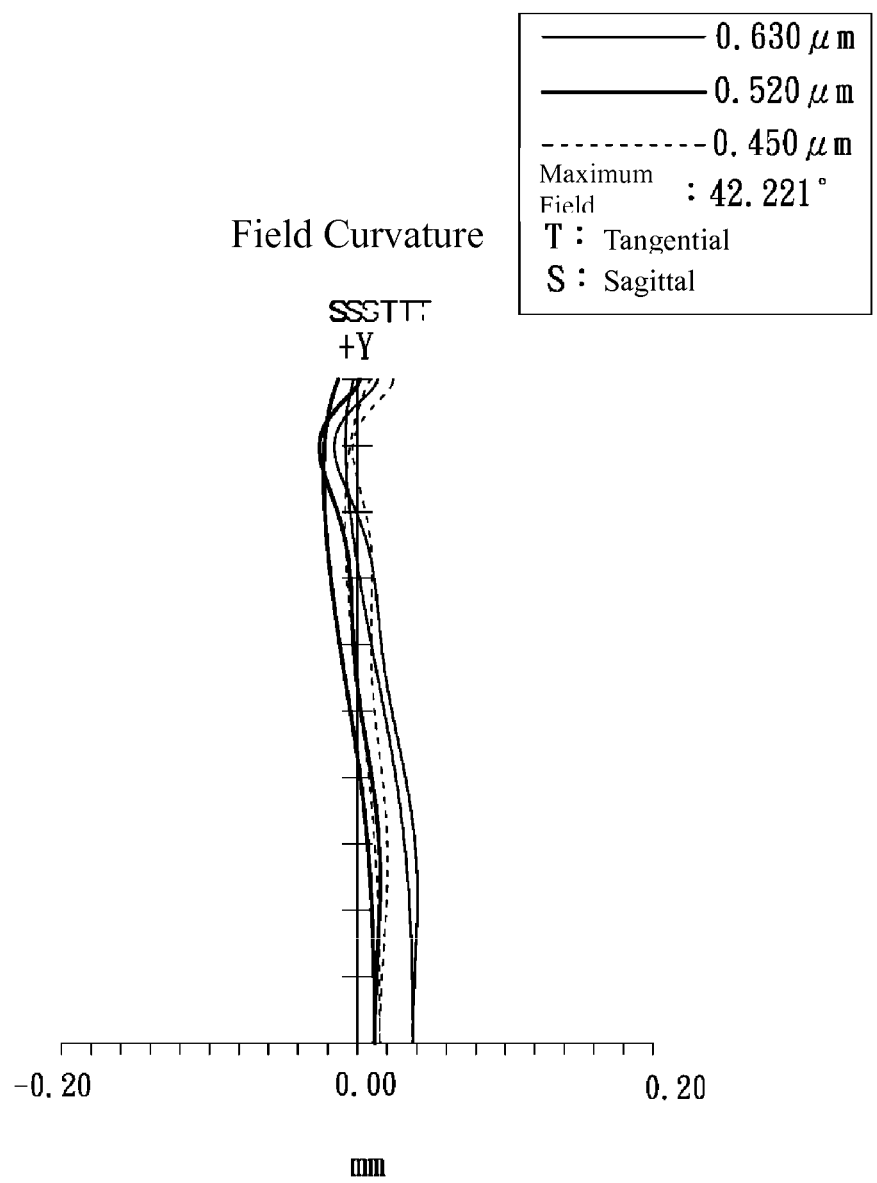
FIG. 2B is a field curvature diagram of the wide-angle projection lens in accordance with the first embodiment of the invention.
Figure 2C:
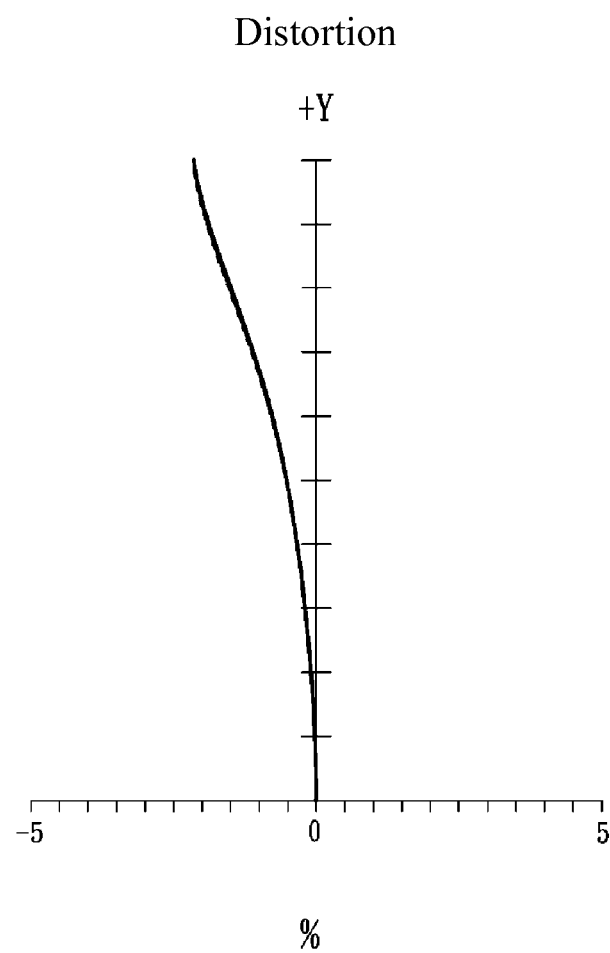
FIG. 2C is a distortion diagram of the wide-angle projection lens in accordance with the first embodiment of the invention.
Figure 2D:
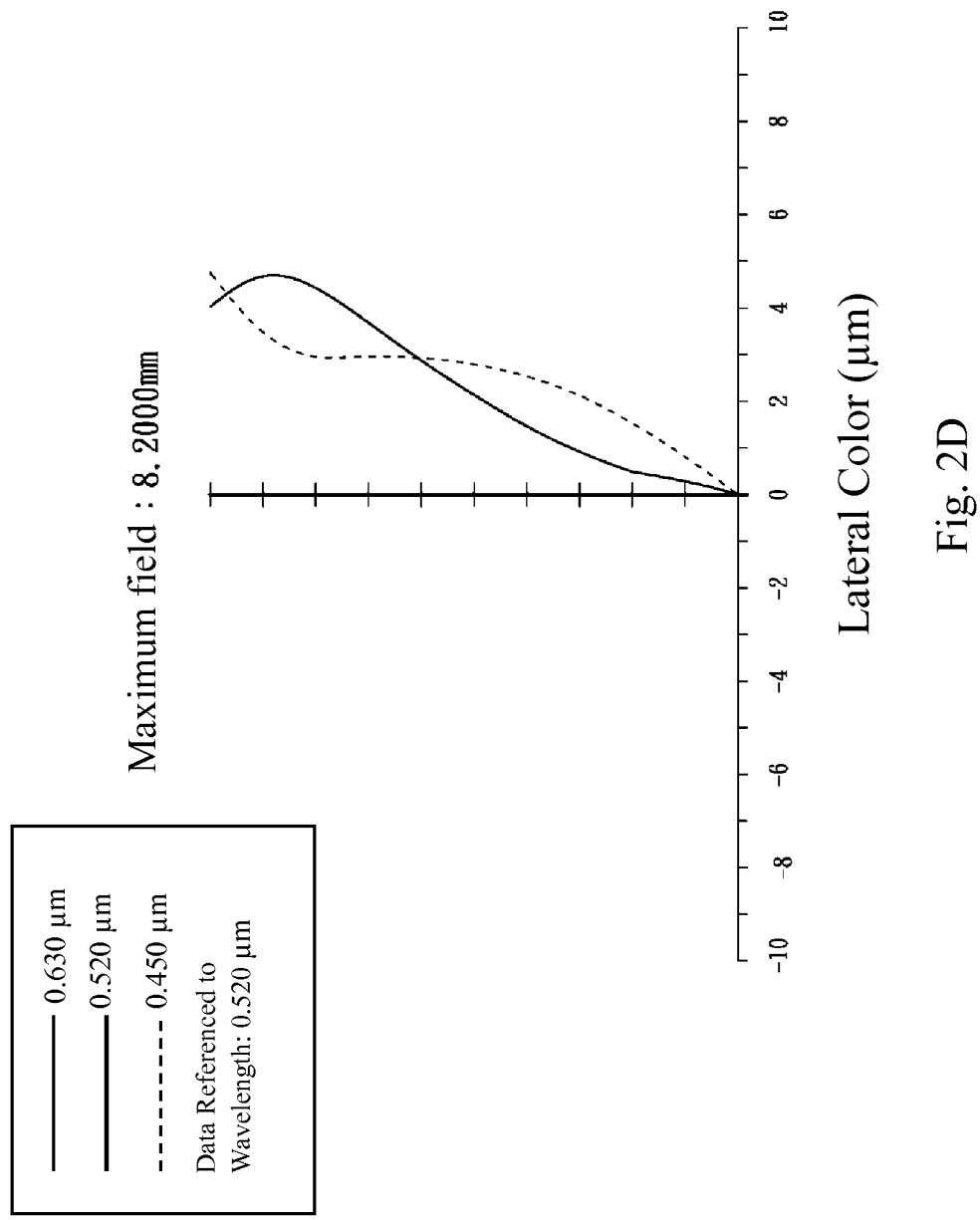
FIG. 2D is a lateral color diagram of the wide-angle projection lens in accordance with the first embodiment of the invention.
Figure 2E:
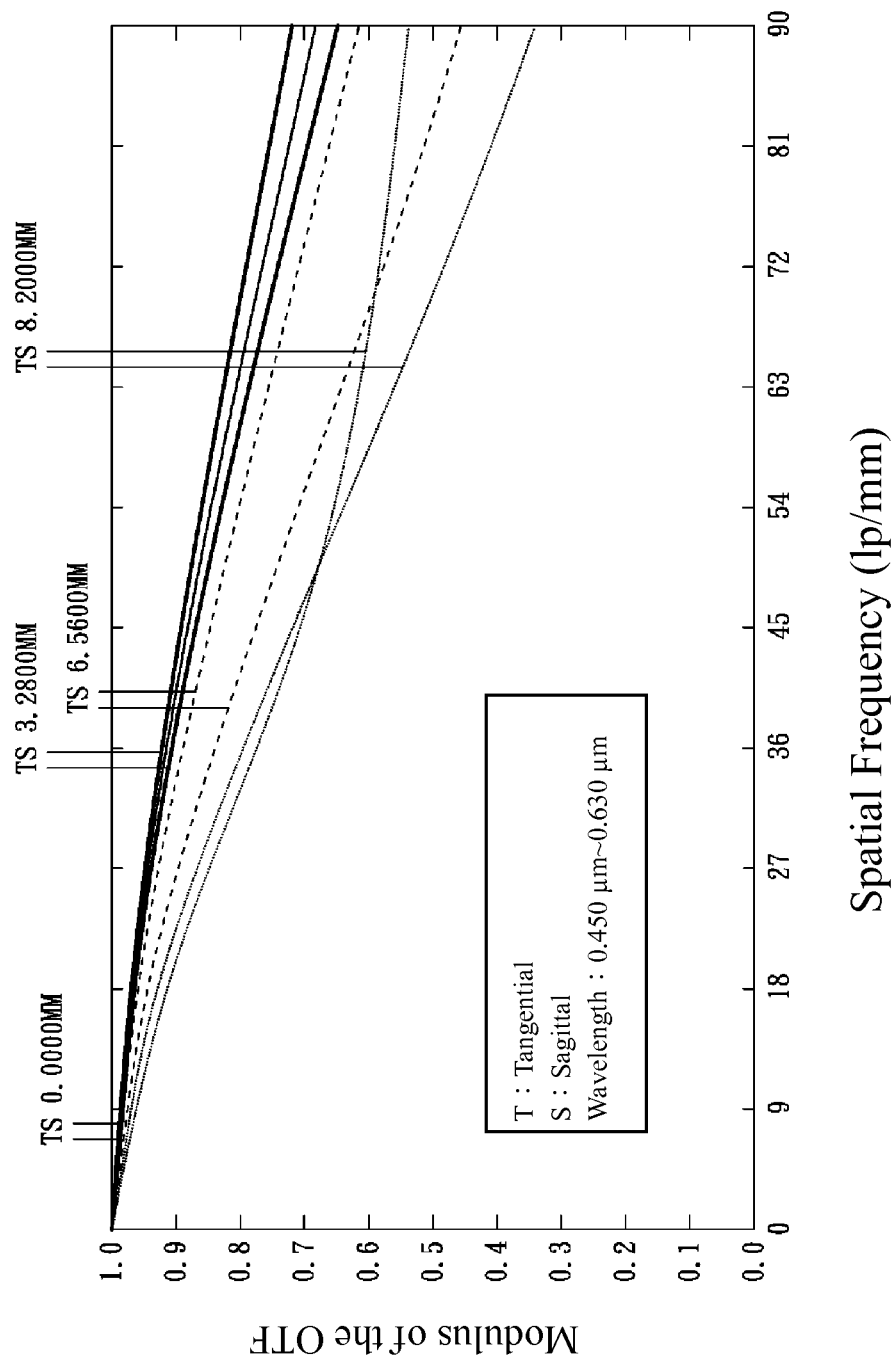
FIG. 2E is a modulation transfer function diagram of the wide-angle projection lens in accordance with the first embodiment of the invention.

By the above arrangements of the lenses and stop ST1, the wide-angle projection lens 1 of the first embodiment can meet the requirements of optical performance as seen in FIGS. 2A-2E, wherein FIG. 2A shows the longitudinal aberration diagram of the wide-angle projection lens 1 of the first embodiment, FIG. 2B shows the field curvature diagram of the wide-angle projection lens 1 of the first embodiment, FIG. 2C shows the distortion diagram of the wide-angle projection lens 1 of the first embodiment, FIG. 2D shows the lateral color diagram of the wide-angle projection lens 1 of the first embodiment and FIG. 2E shows the modulation transfer function diagram of the wide-angle projection lens 1 of the first embodiment.

It can be seen from FIG. 2A that the longitudinal aberration in the first embodiment ranges between −0.015 mm and 0.04 mm for the wavelength of 0.630 µm, 0.520 µm, and 0.450 µm. It can be seen from FIG. 2B that the field curvature of tangential direction and sagittal direction in the first embodiment ranges between −0.04 mm and 0.05 mm for the wavelength of 0.630 µm, 0.520 µm, and 0.450 µm. It can be seen from FIG. 2C (the three curves in the figure are almost overlapped so that it looks like there is only one curve) that the distortion in the first embodiment ranges between −2.5% and 0% for the wavelength of 0.630 µm, 0.520 µm, and 0.450 µm. It can be seen from FIG. 2D that the lateral color, taking the wavelength of 0.520 µm as reference, when fields range between 0 mm and 8.2000 mm in the first embodiment, ranges between 0.0 µm and 5.0 µm for the wavelength of 0.630 µm, 0.520 µm, and 0.450 µm. It can be seen from FIG. 2E that the modulation transfer function of tangential direction and sagittal direction in the first embodiment ranges between 0.34 and 1.0 for the wavelength ranges between 0.450 µm and 0.630 µm, each field is 0.0000 mm, 3.2800 mm, 6.5600 mm and 8.2000 mm, spatial frequency ranges between 0 lp/mm and 90 lp/mm. It is obvious that the longitudinal aberration, the field curvature, the distortion and the lateral color of the wide-angle projection lens 1 of the first embodiment can be corrected effectively, and the resolution of the wide-angle projection lens 1 of the first embodiment can meet the requirement. Therefore, the wide-angle projection lens 1 of the first embodiment is capable of good optical performance.

Figure 3:
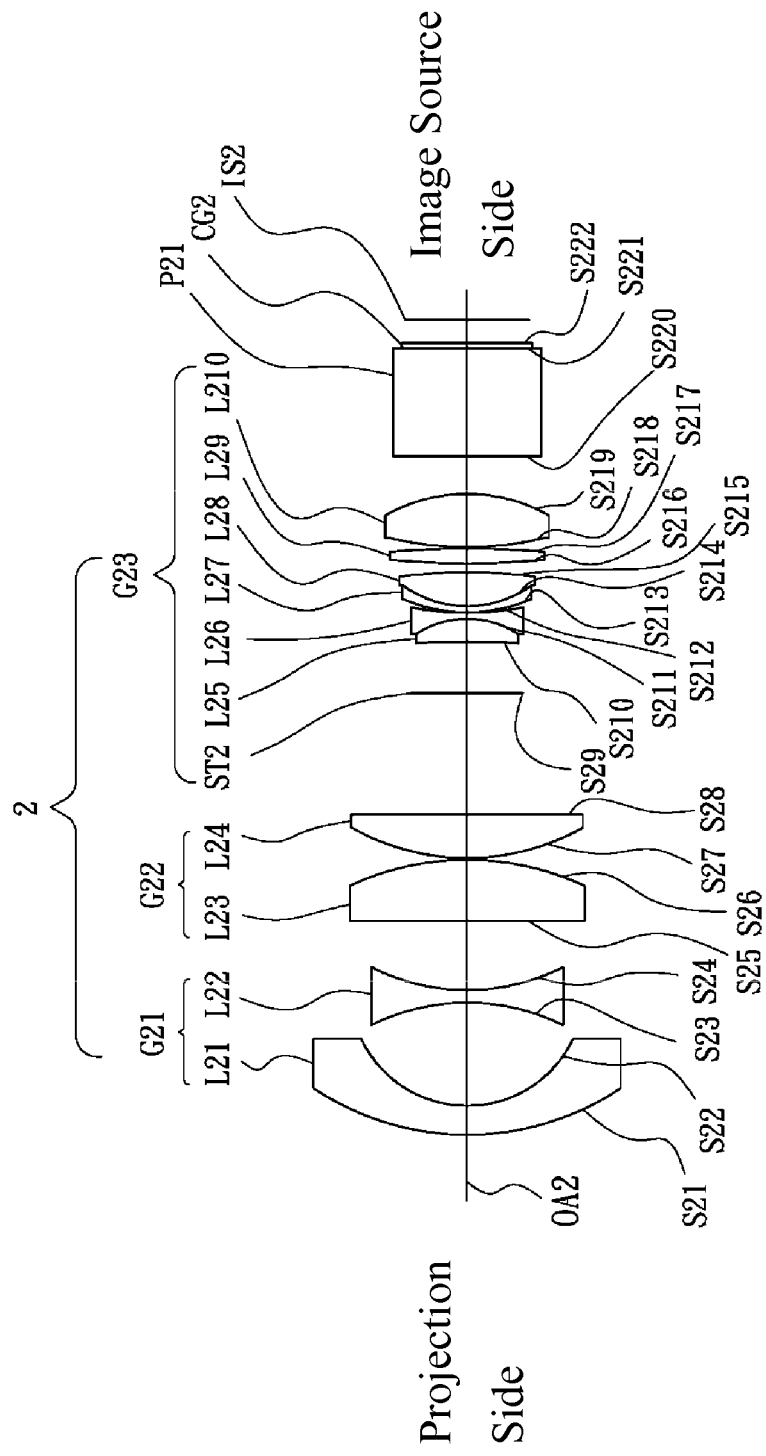
FIG. 3 is a lens layout diagram of a wide-angle projection lens in accordance with a second embodiment of the invention.

Referring to FIG. 3, FIG. 3 is a lens layout diagram of a wide-angle projection lens in accordance with a second embodiment of the invention. The wide-angle projection lens 2 includes a first lens group G21, a second lens group G22 and a third lens group G23, all of which are arranged in order from a projection side to an image source side along an optical axis OA2. In operation, light rays from an image source IS2 are projected on the projection side. The first lens group G21 is with negative refractive power and includes a first lens L21 and a second lens L22, all of which are arranged in order from the projection side to the image source side along the optical axis OA2. The first lens L21 is a meniscus lens made of plastic material and includes a convex surface S21 facing the projection side and a concave surface S22 facing the image source side, wherein both of the convex surface S21 and concave surface S22 are aspheric surfaces. The second lens L22 is a biconcave lens made of glass material, wherein both of a surface S23 facing the projection side and a surface S24 facing the image source side are spherical surfaces. The second lens group G22 is with positive refractive power and includes a third lens L23 and a fourth lens L24, all of which are arranged in order from the projection side to the image source side along the optical axis OA2. The third lens L23 is a biconvex lens made of glass material, wherein both of a surface S25 facing the projection side and a surface S26 facing the image source side are spherical surfaces. The fourth lens L24 is a meniscus lens made of glass material and includes a convex surface S27 facing the projection side and a concave surface S28 facing the image source side, wherein both of the convex surface S27 and the concave surface S28 are spherical surfaces. The third lens group G23 is with positive refractive power and includes a stop ST2, a fifth lens L25, a sixth lens L26, a seventh lens L27, an eighth lens L28, a ninth lens L29 and a tenth lens L210, all of which are arranged in order from the projection side to the image source side along the optical axis OA2. The fifth lens L25 and the sixth lens L26 are cemented together to form a cemented lens which includes a concave surface S210 facing the projection side and a concave surface S212 facing the image source side, wherein both of the surface S210 facing the projection side and the surface S212 facing the image source side are spherical surfaces. The seventh lens L27 and the eighth lens L28 are cemented together to form a cemented lens which includes a convex surface S213 facing the projection side and a convex surface S215 facing the image source side, wherein both of the surface S213 facing the projection side and the surface S215 facing the image source side are spherical surfaces. The ninth lens L29 is a biconvex lens and includes a convex surface S216 facing the projection side and a convex surface S217 facing the image source side, wherein both of the convex surface S216 and the convex surface S217 are spherical surfaces. The tenth lens L210 is a biconvex lens and includes a convex surface S218 facing the projection side and a convex surface S219 facing the image source side, wherein both of the convex surface S218 and the convex surface S219 are aspheric surfaces.

A prism P21 is disposed between the third lens group G23 and the image source IS2. A cover glass CG2 is disposed between the prism P21 and the image source IS2. All of the surfaces S220, S221 and S222 are plane surfaces.

In order to maintain excellent optical performance of the wide-angle projection lens in accordance with this embodiment of the invention, the wide-angle projection lens 2 must satisfies the following five conditions:

$$0.8 < |f2_{G1}/f2| < 1.0 \quad (6)$$

$$1.8 < |f2_{G2}/f2| < 2.3 \quad (7)$$

$$2.0 < |f2_{G3}/f2| < 2.5 \quad (8)$$

$$2.5 < |f2_A/f2| < 3.3 \quad (9)$$

$$4.0 < |tt2/bf2| < 5.0 \quad (10)$$

wherein f2 is an effective focal length of the wide-angle projection lens 2, $f2_{G1}$ is an effective focal length of the first lens group G21, $f2_{G2}$ is an effective focal length of the second lens group G22, $f2_{G3}$ is an effective focal length of the third lens group G23, $f2_A$ is an effective focal length of the aspheric lens included in the third lens group G23, tt2 is a total track length of the wide-angle projection lens 2 and bf2 is a back focal length of the wide-angle projection lens 2.

By the above design of the lenses and stop ST2, the wide-angle projection lens 2 is provided with a shortened total track length, an increased angle of view, a decreased F-number, an increased resolution, an effective corrected aberration and achieves good projection quality.

In order to achieve the above purpose and effectively enhance the optical performance, the wide-angle projection lens 2 in accordance with the second embodiment of the invention is provided with the optical specifications shown in Table 3, which include the effective focal length, F-number, total track length, radius of curvature of each lens surface, thickness between adjacent surface, refractive index of each lens and Abbe number of each lens. Table 3 shows that the effective focal length is equal to 9.166 mm, F-number is equal to 1.50 and total track length is equal to 105.8 mm for the wide-angle projection lens 2 of the second embodiment of the invention.

TABLE 3

Effective Focal Length = 9.166 mm
F-number = 1.50
Total Track Length = 105.8 mm

| Surface Number | Radius of Curvature (mm) | Thickness (mm) | Nd | Vd | Remark |
|---|---|---|---|---|---|
| S21 | 47.55154 | 3.88 | 1.525 | 56.4 | The First Lens L21 |
| S22 | 12.59388 | 13.377 | | | |
| S23 | −27.02 | 1.5 | 1.810 | 40.9 | The Second Lens L22 |
| S24 | 27.02 | 9.02 | | | |
| S25 | 1000 | 8 | 1.810 | 40.9 | The Third Lens L23 |
| S26 | −35.3563 | 0.1 | | | |
| S27 | 29.89426 | 5.73 | 1.790 | 47.4 | The Fourth Lens L24 |
| S28 | 1000 | 15.769 | | | |
| S29 | ∞ | 6.708 | | | Stop ST2 |
| S210 | −85.2672 | 3.02 | 1.50 | 81.5 | The Fifth Lens L25 |
| S211 | −11.5916 | 0.6 | 1.730 | 28.5 | The Sixth Lens L26 |
| S212 | 33.58355 | 0.1 | | | |
| S213 | 20.18161 | 0.8 | 1.830 | 37.2 | The Seventh Lens L27 |
| S214 | 13.94329 | 4.51 | 1.50 | 81.5 | The Eighth Lens L28 |
| S215 | −63.4386 | 1.05 | | | |
| S216 | 96.72 | 2.05 | 1.85 | 23.8 | The Ninth Lens L29 |
| S217 | −93.72 | 0.126 | | | |
| S218 | 30.9841 | 6.96 | 1.52 | 64.0 | The Tenth Lens L210 |
| S219 | −20.4768 | 4.87 | | | |
| S220 | ∞ | 14 | 1.52 | 64.0 | Prism P21 |
| S221 | ∞ | 0.65 | 1.49 | 70.2 | Cover Glass CG2 |
| S222 | ∞ | 2.98 | | | |

Table 3

The aspheric surface sag z of each lens in table 3 can be calculated by the following formula:

$$z = ch^2/\{1 + [1-(k+1)c^2h^2]^{1/2}\} + Ah^4 + Bh^6 + Ch^8 + Dh^{10}$$

where c is curvature, h is the vertical distance from the lens surface to the optical axis, k is conic constant and A, B, C and D are aspheric coefficients.

In the second embodiment, the conic constant k and the aspheric coefficients A, B, C, D of each surface are shown in Table 4.

TABLE 4

| Surface Number | k | A | B | C | D |
|---|---|---|---|---|---|
| S21 | 5.01187 | −3.01E−07 | −1.98E−09 | 9.26E−12 | −1.69E−14 |
| S22 | −0.70861 | −1.09E−05 | −1.07E−08 | 2.61E−10 | 3.31E−13 |
| S218 | 0 | −3.73E−05 | 1.84E−08 | 9.67E−10 | 1.53E−12 |
| S219 | −1.00729 | 6.19E−06 | 9.24E−08 | −4.64E−10 | −5.21E−13 |

Table 4

For the wide-angle projection lens 2 of the second embodiment, the effective focal length f2 of the wide-angle projection lens 2 is equal to 9.166 mm, the effective focal length $f2_{G1}$ of the first lens group G21 is equal to −8.775 mm, the effective focal length $f2_{G2}$ of the second lens group G22 is equal to 20.176 mm, the effective focal length $f2_{G3}$ of the third lens group G23 is equal to 22.382 mm, the effective focal length $f2_A$ of the aspheric lens included in the third lens group G23 is equal to 24.95 mm, the total track length tt2 is equal to 105.8 mm and the back focal length bf2 is equal to 22.5 mm. According to the above data, the following values can be obtained:

$|f2_{G1}/f2|=0.955$ $|f2_{G2}/f2|=2.201$ $|f2_{G3}/f2|=2.442$ $|f2_A/f2|=2.722$ $|tt2/bf2|=4.7$ which respectively satisfy the above conditions (6)-(10).

Figure 4A:
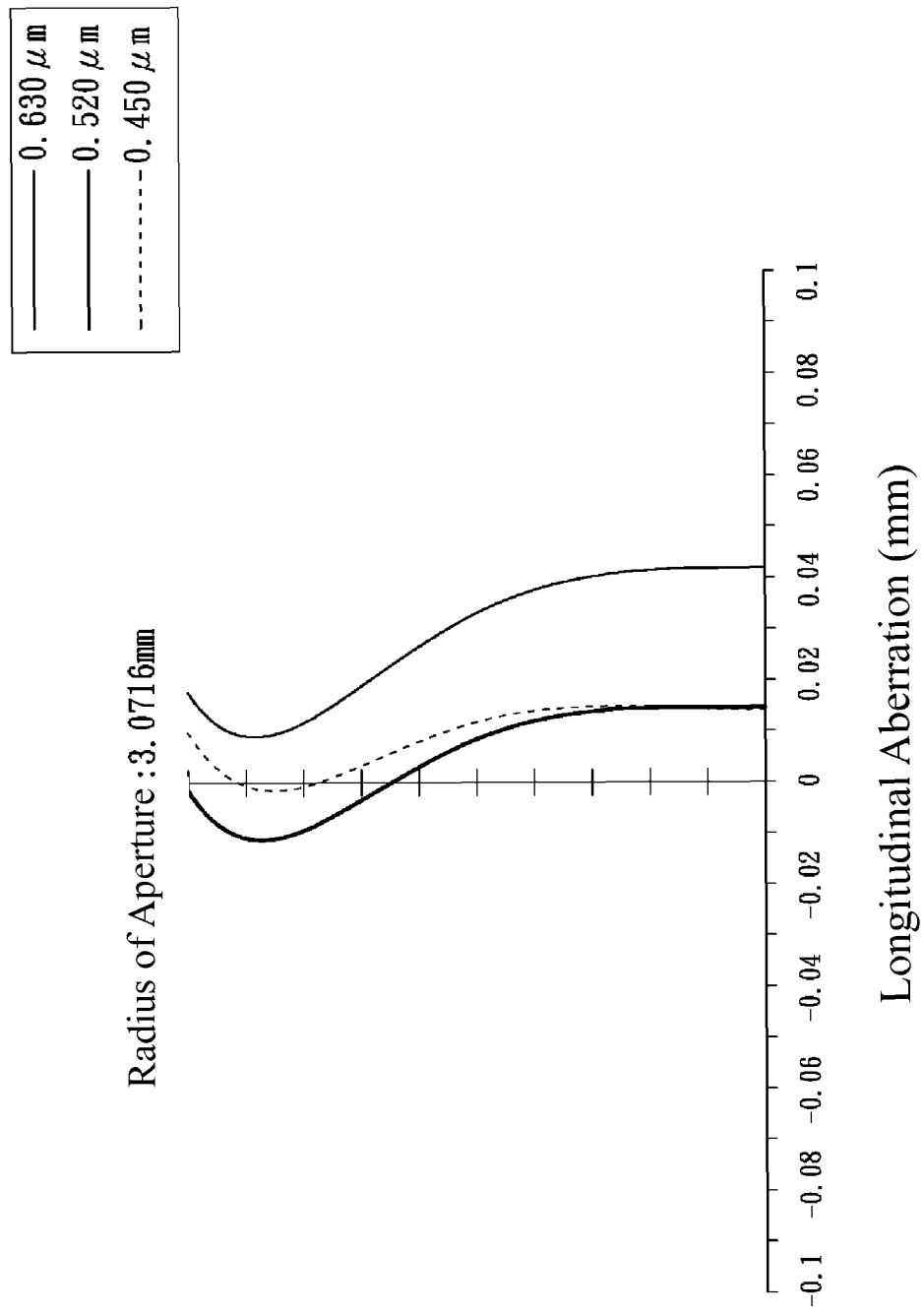
FIG. 4A is a longitudinal aberration diagram of the wide-angle projection lens in accordance with the second embodiment of the invention.
Figure 4B:
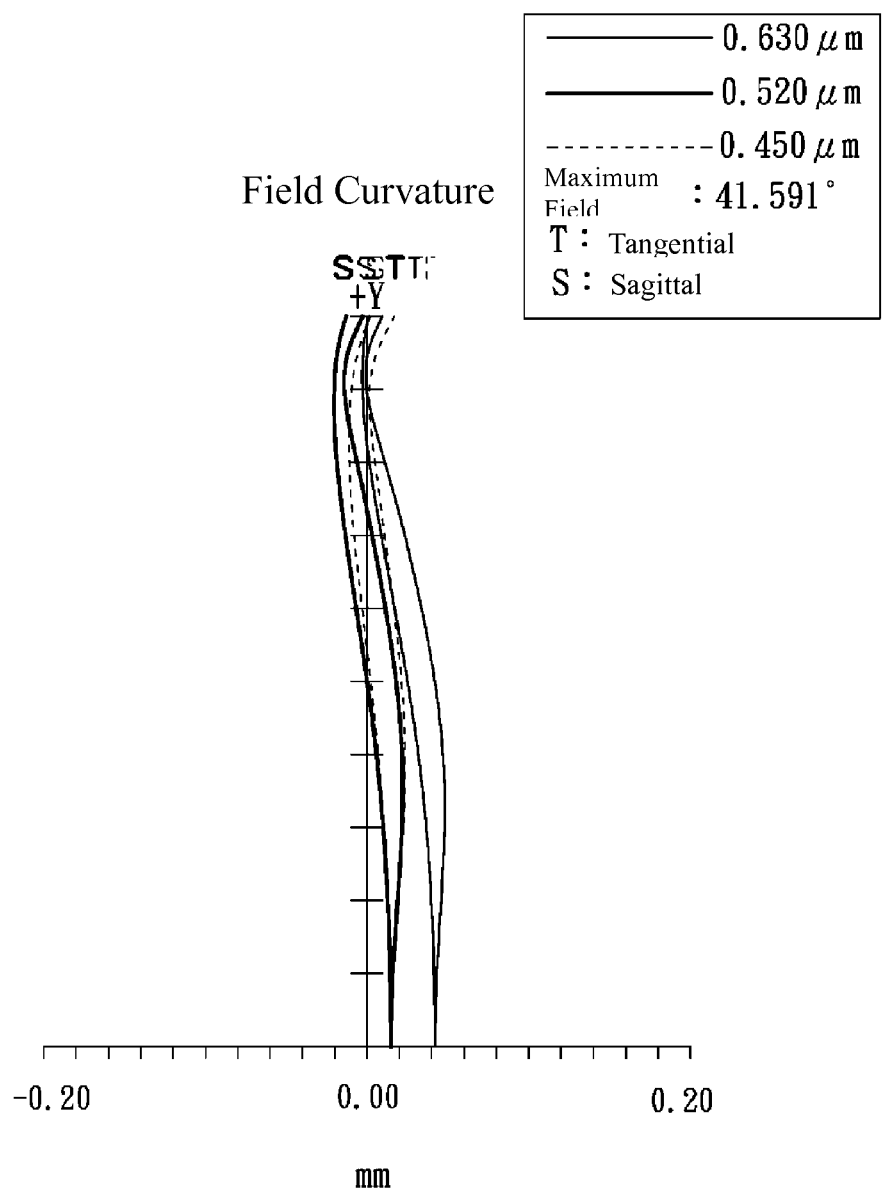
FIG. 4B is a field curvature diagram of the wide-angle projection lens in accordance with the second embodiment of the invention.
Figure 4C:
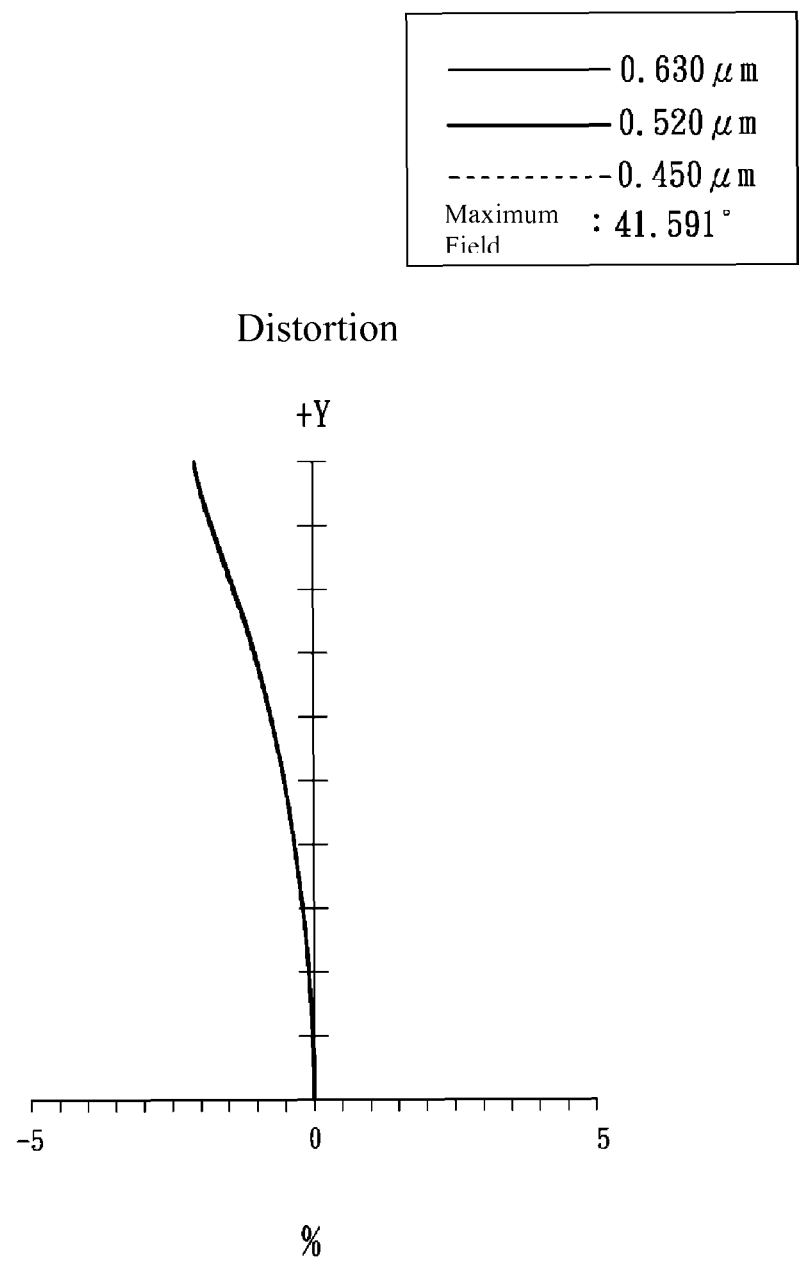
FIG. 4C is a distortion diagram of the wide-angle projection lens in accordance with the second embodiment of the invention.
Figure 4D:
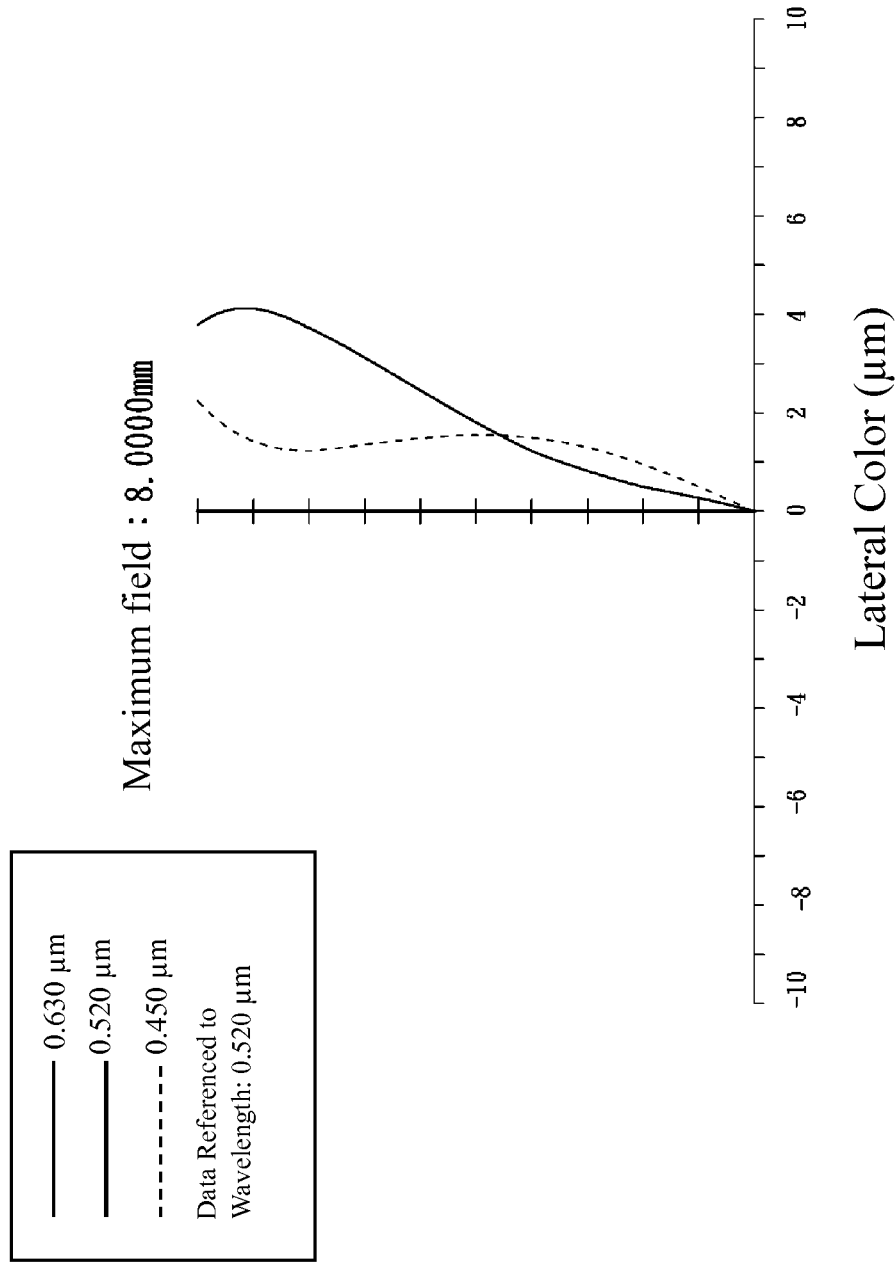
FIG. 4D is a lateral color diagram of the wide-angle projection lens in accordance with the second embodiment of the invention.
Figure 4E:
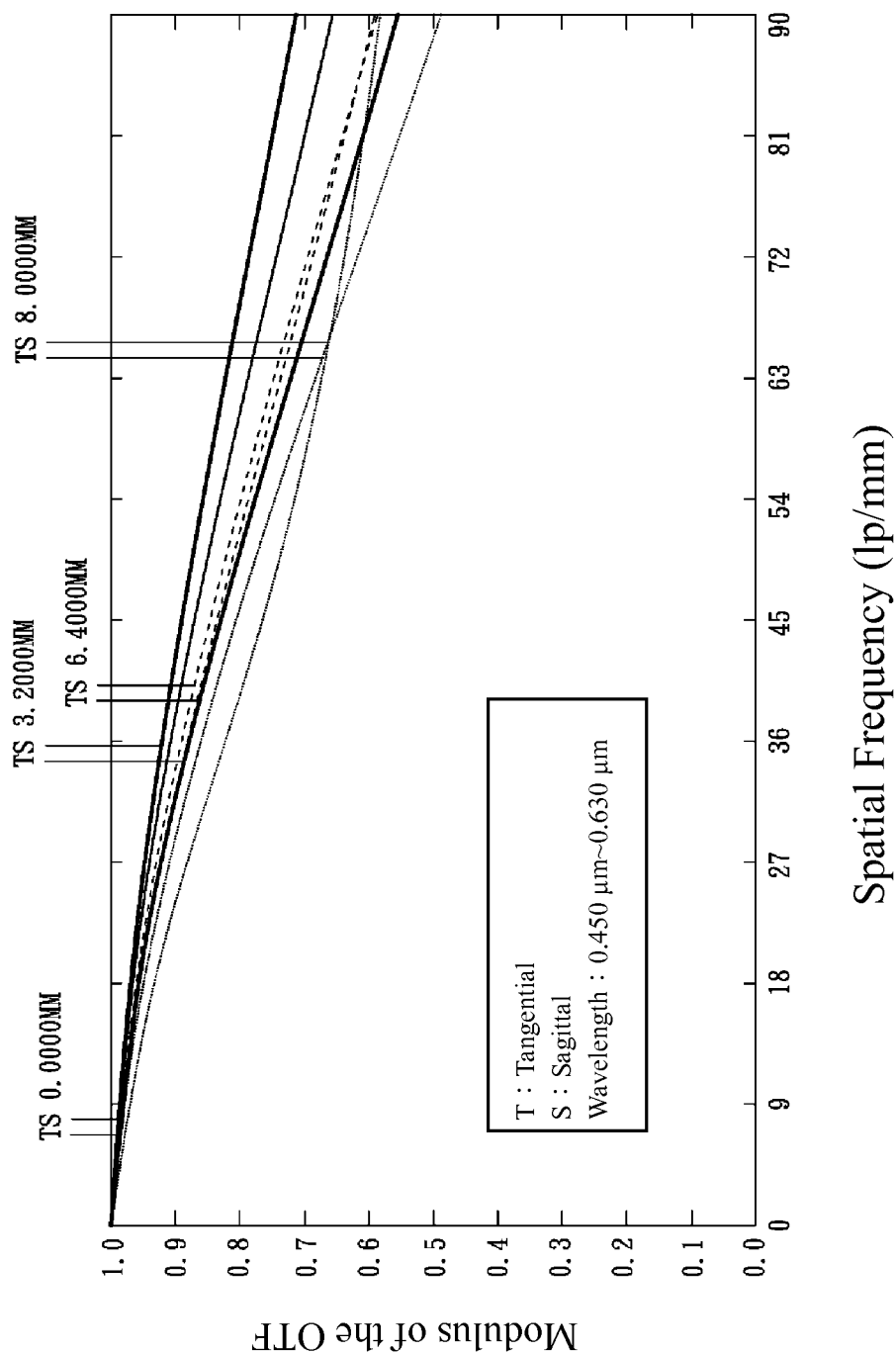
FIG. 4E is a modulation transfer function diagram of the wide-angle projection lens in accordance with the second embodiment of the invention.

By the above arrangements of the lenses and stop ST2, the wide-angle projection lens 2 of the second embodiment can meet the requirements of optical performance as seen in FIGS. 4A-4E, wherein FIG. 4A shows the longitudinal aberration diagram of the wide-angle projection lens 2 of the second embodiment, FIG. 4B shows the field curvature diagram of the wide-angle projection lens 2 of the second embodiment, FIG. 4C shows the distortion diagram of the wide-angle projection lens 2 of the second embodiment, FIG. 4D shows the lateral color diagram of the wide-angle projection lens 2 of the second embodiment and FIG. 4E shows the modulation transfer function diagram of the wide-angle projection lens 2 of the second embodiment.

It can be seen from FIG. 4A that the longitudinal aberration in the second embodiment ranges between −0.015 mm and 0.045 mm for the wavelength of 0.630 μm, 0.520 μm, and 0.450 μm. It can be seen from FIG. 4B that the field curvature of tangential direction and sagittal direction in the second embodiment ranges between −0.02 mm and 0.05 mm for the wavelength of 0.630 μm, 0.520 μm, and 0.450 μm. It can be seen from FIG. 4C (the three curves in the figure are almost overlapped so that it looks like there is only one curve) that the distortion in the second embodiment ranges between −2.2% and 0% for the wavelength of 0.630 μm, 0.520 μm, and 0.450 μm. It can be seen from FIG. 4D that the lateral color, taking the wavelength of 0.520 μm as reference, when fields range between 0 mm and 8.0000 mm in the second embodiment, ranges between 0.0 μm and 4.2 μm for the wavelength of 0.630 μm, 0.520 μm, and 0.450 μm. It can be seen from FIG. 4E that the modulation transfer function of tangential direction and sagittal direction in the second embodiment ranges between 0.48 and 1.0 for the wavelength ranges between 0.450 μm and 0.630 μm, each field is 0.0000 mm, 3.2000 mm, 6.4000 mm and 8.0000 mm, spatial frequency ranges between 0 lp/mm and 90 lp/mm. It is obvious that the longitudinal aberration, the field curvature, the distortion and the lateral color of the wide-angle projection lens 2 of the second embodiment can be corrected effectively, and the resolution of the wide-angle projection lens 2 of the second embodiment can meet the requirement. Therefore, the wide-angle projection lens 2 of the second embodiment is capable of good optical performance.

The invention claimed is:

1. An wide-angle projection lens comprising, in order from a projection side to an image source side along an optical axis:
   a first lens group with negative refractive power;
   a second lens group with positive refractive power; and
   a third lens group with positive refractive power;
   wherein the third lens group comprises a first lens, a second lens, a third lens, a fourth lens, a fifth lens and a sixth lens, all of which are arranged in order from the projection side to the image source side along the optical axis, wherein the first lens and the second lens are cemented together to form a cemented lens, wherein the third lens and the fourth lens are cemented together to form a cemented lens and there is no air gap between the third lens and the fourth lens, wherein the wide-angle projection lens satisfies: 4.0<|tt/bf|<5.0 where tt is a total track length of the wide-angle projection lens and bf is a back focal length of the wide-angle projection lens, wherein the third lens has a negative refractive power.

2. The wide-angle projection lens according to claim 1, wherein $0.8<|f_{G1}/f|<1.0$, where $f_{G1}$ is an effective focal length of the first lens group and f is an effective focal length of the wide-angle projection lens.

3. The wide-angle projection lens according to claim 1, wherein $1.8<|f_{G2}/f|<2.3$, where $f_{G2}$ is an effective focal length of the second lens group and f is an effective focal length of the wide-angle projection lens.

4. The wide-angle projection lens according to claim 1, wherein the third lens group has at least one lens which is an aspheric lens and satisfies:

$2.0<|f_{G3}/f|<2.5$ $2.5<|f_A/f|<3.3$ where $f_{G3}$ is an effective focal length of the third lens group, f is an effective focal length of the wide-angle projection lens, and $f_A$ is an effective focal length of the aspheric lens.

5. The wide-angle projection lens according to claim 1, wherein the first lens group comprises a seventh lens and an eighth lens, all of which are arranged in order from the projection side to the image source side along the optical axis, and the second lens group comprises a ninth lens and a tenth lens, all of which are arranged in order from the projection side to the image source side along the optical axis.

6. The wide-angle projection lens according to claim 5, wherein the seventh lens is an aspheric plastic lens and the eighth lens is a spherical glass lens.

7. The wide-angle projection lens according to claim 5, wherein the ninth lens and the tenth lens are spherical glass lenses.

8. The wide-angle projection lens according to claim 1, wherein the third lens group further comprises a stop disposed between the second lens group and the first lens.

9. An wide-angle projection lens comprising, in order from a projection side to an image source side along an optical axis:

a first lens group with negative refractive power;
a second lens group with positive refractive power; and
a third lens group with positive refractive power;
wherein the third lens group comprises a first lens, a second lens, a third lens, a fourth lens, a fifth lens and a sixth lens, all of which are arranged in order from the projection side to the image source side along the optical axis, wherein the third lens and the fourth lens are cemented together to form a cemented lens and there is no air gap between the third lens and the fourth lens, wherein the first lens comprises a concave surface facing the projection side, wherein the third lens comprises a convex surface facing the projection side, wherein the wide-angle projection lens satisfies: $0.8<|f_{G1}/f|<1.0$ where $f_{G1}$ is an effective focal length of the first lens group and f is an effective focal length of the wide-angle projection lens.

10. The wide-angle projection lens according to claim 9, wherein the third lens has a negative refractive power.

11. The wide-angle projection lens according to claim 9, wherein the third lens group has at least one lens which is an aspheric lens and satisfies:

$2.0<|f_{G3}/f|<2.5$ $2.5<|f_4/f|<3.3$ where $f_{G3}$ is an effective focal length of the third lens group, f is an effective focal length of the wide-angle projection lens, and $f_4$ is an effective focal length of the aspheric lens.

12. The wide-angle projection lens according to claim 9, wherein the first lens group comprises a seventh lens and an eighth lens, both of which are arranged in order from the projection side to the image source side along the optical axis, wherein the seventh lens is an aspheric plastic lens and the eighth lens is a spherical glass lens.

13. The wide-angle projection lens according to claim 9, wherein the second lens group comprises a ninth lens and a tenth lens, both of which are arranged in order from the projection side to the image source side along the optical axis, wherein the ninth lens and the tenth lens are spherical glass lenses.

14. The wide-angle projection lens according to claim 9, wherein the third lens has a negative refractive power, wherein the first lens and the second lens are cemented together to form a cemented lens.

15. The wide-angle projection lens according to claim 9, wherein the third lens group further comprises a stop disposed between the second lens group and the first lens, wherein the first lens group comprises a seventh lens and an eighth lens, and the second lens group comprises a ninth lens and a tenth lens, all of which are arranged in order from the projection side to the image source side along the optical axis.

16. The wide-angle projection lens according to claim 9, wherein the wide-angle projection lens satisfies: $4.0<|tt/bf|<5.0$ where tt is a total track length of the wide-angle projection lens and bf is a back focal length of the wide-angle projection lens.

17. An wide-angle projection lens comprising, in order from a projection side to an image source side along an optical axis:
a first lens group with negative refractive power;
a second lens group with positive refractive power; and
a third lens group with positive refractive power;
wherein the third lens group comprises a first lens, a second lens, a third lens, a fourth lens, a fifth lens and a sixth lens, all of which are arranged in order from the projection side to the image source side along the optical axis, wherein the third lens and the fourth lens are cemented together to form a cemented lens and there is no air gap between the third lens and the fourth lens, wherein the first lens comprises a concave surface facing the projection side, wherein the third lens comprises a convex surface facing the projection side, wherein the wide-angle projection lens satisfies: $1.8<|f_{G2}/f|<2.3$ where $f_{G2}$ is an effective focal length of the second lens group and f is an effective focal length of the wide-angle projection lens.

18. The wide-angle projection lens according to claim 17, wherein $0.8<|f_{G1}/f|<1.0$, where $f_{G1}$ is an effective focal length of the first lens group and f is an effective focal length of the wide-angle projection lens.

* * * * *